United States Patent
Kim et al.

(10) Patent No.: US 10,059,786 B2
(45) Date of Patent: Aug. 28, 2018

(54) APPARATUS AND METHOD FOR SELECTIVELY PREPARING REACTIVE POLYBUTENE AND NONREACTIVE POLYBUTENE

(71) Applicant: DAELIM INDUSTRIAL CO., LTD., Seoul (KR)

(72) Inventors: Myeong Seok Kim, Sejong (KR); Min Sup Park, Daejeon (KR); Hyung Jae Seo, Daejeon (KR); Se Hyun Lee, Daejeon (KR)

(73) Assignee: DAELIM INDUSTRIAL CO., LTD., Seoul (KR)

( * ) Notice: Subject to any disclaimer, the term of this patent is extended or adjusted under 35 U.S.C. 154(b) by 0 days.

(21) Appl. No.: 14/890,489

(22) PCT Filed: May 15, 2014

(86) PCT No.: PCT/KR2014/004353
§ 371 (c)(1),
(2) Date: Nov. 11, 2015

(87) PCT Pub. No.: WO2014/185723
PCT Pub. Date: Nov. 20, 2014

(65) Prior Publication Data
US 2016/0108155 A1    Apr. 21, 2016

(30) Foreign Application Priority Data
May 16, 2013 (KR) ................ 10-2013-0055713

(51) Int. Cl.
C08F 10/10 (2006.01)
B01J 8/00 (2006.01)
(Continued)

(52) U.S. Cl.
CPC ............ *C08F 210/10* (2013.01); *B01J 19/24* (2013.01); *C08F 10/08* (2013.01); *B01J 8/008* (2013.01); *B01J 2219/24* (2013.01); *C08F 10/10* (2013.01)

(58) Field of Classification Search
None
See application file for complete search history.

(56) References Cited

U.S. PATENT DOCUMENTS

| 5,191,044 A | 3/1993 | Rath et al. |
| 6,562,913 B1 | 5/2003 | Baxter, Jr. et al. |

(Continued)

FOREIGN PATENT DOCUMENTS

| CN | 1769306 A | 5/2006 |
| CN | 102770463 A | 11/2012 |

(Continued)

OTHER PUBLICATIONS

Written Opinion dated Jul. 7, 2014 issued in corresponding International Application No. PCT/KR2014/004353.
(Continued)

*Primary Examiner* — Richard A Huhn
(74) *Attorney, Agent, or Firm* — Nath, Goldberg & Meyer; Tanya E. Harkins; Joshua B. Goldberg

(57) ABSTRACT

There are disclosed an apparatus and a method for selectively preparing a high reactivity polybutene, a midrange reactivity polybutene and a non-reactive polybutene in a single plant. The apparatus for selectively preparing a reactive polybutene and a non-reactive polybutene, comprises: a reactive polybutene polymerization catalyst feeder for polymerization of the reactive polybutene; a non-reactive polybutene polymerization catalyst feeder for polymerization of the non-reactive polybutene; and a reactor for polymerizing a reactant including isobutene into polybutene, (Continued)

wherein the reactive polybutene polymerization catalyst feeder provides a catalyst to yield the reactive polybutene; and the non-reactive polybutene polymerization catalyst feeder provides a catalyst to yield the non-reactive polybutene.

5 Claims, 1 Drawing Sheet

(51) Int. Cl.
  *C08F 210/10* (2006.01)
  *C08F 10/08* (2006.01)
  *B01J 19/24* (2006.01)

(56) References Cited

U.S. PATENT DOCUMENTS

| | | | |
|---|---|---|---|
| 6,825,292 B2 | 11/2004 | Reid | |
| 2003/0032740 A1* | 2/2003 | Baxter, Jr. | C08F 10/00 526/64 |
| 2004/0110910 A1* | 6/2004 | Arjunan | C08F 10/06 526/127 |
| 2007/0135591 A1 | 6/2007 | Brown et al. | |
| 2009/0292085 A1* | 11/2009 | Kiss | C08F 10/00 526/64 |
| 2012/0252989 A1 | 10/2012 | Dewatcher et al. | |
| 2012/0309910 A1 | 12/2012 | Dewatcher et al. | |

FOREIGN PATENT DOCUMENTS

| | | |
|---|---|---|
| KR | 10-0152136 B | 10/1998 |
| KR | 10-0154362 B | 12/1998 |
| KR | 10-0154363 B | 12/1998 |
| KR | 10-2006-0126591 A | 12/2006 |
| KR | 10-0787851 B | 12/2007 |
| KR | 10-2010-0069011 A | 6/2010 |
| WO | 2011/073369 A1 | 6/2011 |

OTHER PUBLICATIONS

Extended Search Report dated Jan. 18, 2017 issued in corresponding European Application No. 14797177.4.

* cited by examiner

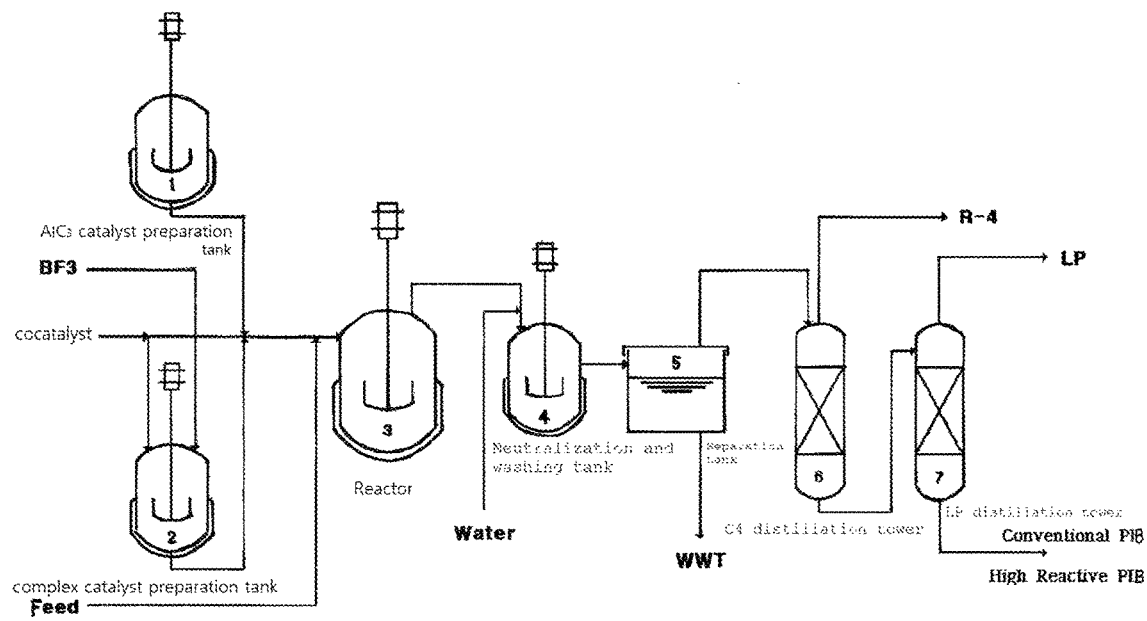

APPARATUS AND METHOD FOR SELECTIVELY PREPARING REACTIVE POLYBUTENE AND NONREACTIVE POLYBUTENE

TECHNICAL FIELD

The present invention relates to an apparatus and a method for selective preparation of a reactive polybutene and a non-reactive polybutene, and more particularly to an apparatus and a method for selectively preparing a high reactivity polybutene, a midrange reactivity polybutene and a non-reactive polybutene in a single plant.

BACKGROUND ART

Polybutene is the polymer formed by the polymerization of a mixture of olefin components having four carbon atoms (C4), derived by the naphtha cracking process, using a Friedel-Craft type catalyst. The number average molecular weight (Mn) is about 300 to 5,000. The C4 residual obtained after extraction of 1,3-butadiene from crude C4 is referred to as "C4 raffinate-1", which includes paraffins, such as isobutene, n-butane, etc., and olefins, such as 1-butene, 2-butene, isobutene, etc. The isobutene content is approximately 30 to 50 wt. %. The C4 raffinate-1 is primarily used in the preparation of methyl-t-butyl ether (MTBE), which is a gasoline additive to raise the octane number, or polybutene. Isobutene is the most reactive one of the olefin components in the C4 raffinate-1, so the polybutene prepared from isobutene is primarily composed of isobutene units. The polybutene can also be produced from high-purity isobutene or butane-butene raffinate (B-B raffinate) that is a C4 mixture derived by the crude oil refining process.

The viscosity of the polybutene increases with an increase in the molecular weight and ranges from about 4 to 40,000 cSt (centi-stocks). Further, the polybutene is susceptible to pyrolysis at a temperature of 300° C. or above without residue and very soluble to lubricating oils or fuels due to its branched chain having an alkyl structure. Thus, the polybutene can be added to engine oils as an anti-scuff agent or a viscosity index improver, or mixed with fuels in the internal combustion engine for automobile or the like and used as a cleaning agent.

Because polybutene is mainly used in gluing agents, adhesives or insulating oils, high reactivity polybutene has not been favored. In recent years, however, the demands for high reactivity polybutene have risen steadily with the increasing use of the polybutene having polar groups introduced to enhance reactivity as a fuel cleaner or a lubricant additive. Thus, non-reactive polybutene (generally called and referred to as "regular polybutene" in this specification as needed) is used in gluing agents, adhesives, insulating oils, etc., while high reactivity polybutene and midrange reactivity polybutene, capable of having polar groups introduced using reactivity, are mainly used in fuel cleaners or lubricant additives. Most widely used polybutene products produced by introducing polar groups into polybutene are, for example, polyisobutenyl succinic anhydrides (PIBSA) prepared by reacting the terminal double bond of high reactivity polybutene with maleic anhydride in a thermal process, and alkyl phenols (e.g., polybutenyl phenol, etc.) prepared by the Manich reaction of phenols and midrange reactivity polybutene. These polybutene products are advantageously considered as functional polymers. Most of the lubricant additives or fuel cleaners are prepared with the PIBSA used as an intermediate. As the double bonds of the polybutene used in the preparation of PIBSA are positioned towards the end of the polybutene, the PIBSA can be produced with higher yield. But, the yield of PIBSA possibly decreases due to steric hindrance and the resultant lower reactivity in the case that the double bonds are positioned towards the interior of the polybutene and that the more alkyl groups are attached to the double bonds as substituents.

Forming a terminal double bond of a molecule and then terminating the polymerization reaction means the production of a compound that goes against the general theories of chemical reactions. In the preparation of high reactivity polybutene and midrange reactivity polybutene (also called "middle vinylidene polybutene") that are difficult to produce, the most important factors are the type of the catalyst and the composition of the cocatalyst system selected in the preparation. Other variables, such as the reaction temperature, the strength of the catalyst, etc., can also to be taken into consideration in the preparation process.

Prior to the advent of high reactivity polybutene, regular polybutene, that is, non-reactive polybutene has been used in the preparation of PIBSA. For enhancing the reactivity of the non-reactive polybutene, polybutene is chlorinated with chlorine gas through a chlorination reaction and reacted with maleic anhydride to yield PIBSA. Then, amines are added to the PIBSA to complete the final product. However, this method is not desirable in the economic and environmental aspects, since it costs too much due to expensive equipment used to prevent the corrosion of the reactor and uses a large quantity of a base solution to neutralize the unreacted chlorine gas. In addition, when the final product prepared by adding amines to the PIBSA with the chlorine content raised through the chlorination reaction is used as a fuel additive or the like, it may cause some problems, including corrosion of the internal combustion engine such as automobile engines, etc. and emission of chlorine as an exhaust gas. Accordingly, an improvement has been made towards the method of preparing lubricant additives or fuel cleaners using high reactivity polybutene. Such an advance of using high reactivity polybutenes in the place of non-reactive polybutenes in the lubricant additives or fuel cleaners can be considered as a process improvement that eliminates one step of the reaction and as an eco-friendly method that excludes emission of the toxic chlorine ($Cl_2$) gas.

The non-reactive polybutene is used in a variety of applications, such as gluing agents, adhesives, sealants, lubricant additives, insulating oils, etc., that are required to secure chemical stability (non-reactivity), thermal stability, water barrier property, cohesion, adhesiveness, and so forth. Like this, high reactivity polybutene, midrange reactivity polybutene and non-reactive polybutene are different from one another in their use purpose. It is therefore necessary to control the production of each polybutene in accordance with the demands for the individual polybutenes.

U.S. Pat. Nos. 4,605,808, 5,068,490, 5,191,044, 5,408,018, 5,962,604, and 6,300,444 disclose a preparation method for high reactivity polybutene that has a vinylidene content of at least 70%, more preferably at least 80%, using boron trifluoride or a complex compound of boron trifluoride in the presence of a cocatalyst, such as water, ether, alcohol, etc. U.S. Pat. No. 7,037,999 B2 describes a polybutene having a vinylidene content less than 70% and a tetra-substituted double bond content less than 10%, and its preparation method. Korean Patent No. 10-0787851 mentions the advantages of the tetra-substituted double bonds and an economically effective preparation method for polybutene and specifies a preparation method for midrange reactivity polybutene. Despite that such a number of related patents are given for the high reactivity polybutene, midrange reactivity polybutene and non-reactive polybutene, there can be found no method for selective preparation of a high reactivity polybutene, a midrange reactivity polybutene and a non-reactive polybutene in a single plant.

DISCLOSURE OF INVENTION

It is therefore an object of the present invention to provide an apparatus and method for selectively preparing a high reactivity polybutene having a terminal alpha-substituted carbon-carbon double bond (hereinafter, referred to as "vinylidene") content greater than 70%, a midrange reactivity polybutene having a vinylidene content of 40 to 70%, and a non-reactive polybutene having a vinylidene content less than 40%.

It is another object of the present invention to provide a method of selectively preparing three different types of polybutene each having a different use purpose in a single plant designed to produce one product from the supplied raw materials, thereby eliminating a need for building two plants in contrast to the conventional preparation methods to reduce the investment cost and producing three different types of polybutene under control according to the demands for each polybutene in the market.

To achieve the objects of the present invention, there is provided an apparatus for selectively preparing a reactive polybutene and a non-reactive polybutene that includes: a reactive polybutene polymerization catalyst feeder for polymerization of a high reactivity polybutene and a midrange reactivity polybutene; a non-reactive polybutene polymerization catalyst feeder for polymerization of a non-reactive polybutene; and a reactor for polymerizing a reactant including isobutene into polybutene. In the apparatus, the reactive polybutene polymerization catalyst feeder provides a catalyst to yield a high reactivity polybutene and a midrange reactivity polybutene; and the non-reactive polybutene polymerization catalyst feeder provides a catalyst to yield a non-reactive polybutene.

To achieve the objects of the present invention, there is provided a method for selectively preparing a reactive polybutene and a non-reactive polybutene, comprising: selectively producing a reactive polybutene polymerization catalyst for polymerization of the high reactivity polybutene and the mid-range reactivity polybutene or a non-reactive polybutene polymerization catalyst for polymerization of the non-reactive polybutene; and, polymerizing a reactant including isobutene in the presence of the reactive polybutene polymerization catalyst or the non-reactive polybutene polymerization catalyst, thereby yielding the reactive polybutene when using the reactive polybutene polymerization catalyst or the non-reactive polybutene when using the non-reactive polybutene polymerization catalyst.

Effects of the Invention

The method of selectively preparing a high reactivity polybutene, a midrange reactivity polybutene and a non-reactive polybutene in a single plant according to the present invention has a definite difference from the conventional worldwide polybutene preparation methods that are designed to produce only one of the three polybutenes in a single plant. While it generally costs about 120 billion KRW to build a plant for polybutene production in consideration of the profit, the parallel preparation method of the present invention can produce all of the three types of polybutene at the cost of a single plant.

In addition, the preparation method of the present invention enables selective production and supply of three types of polybutene to meet the customer's demands in accordance with the rapidly changing world economy and market conditions. Even in the case that a petrochemical plant is built in consideration of the profit, a low operation ratio of the plant pertaining to the world economy and market conditions may incur a huge loss. The preparation method of the present invention, however, allows it to flexibly cope with the change of the market conditions and thereby to maximize the operation ratio and profitability of the plant as well.

BRIEF DESCRIPTION OF DRAWINGS

FIG. 1 is a schematic diagram showing an apparatus for selectively preparing a reactive polybutene and a non-reactive polybutene in accordance with one embodiment of the present invention.

BEST MODES FOR CARRYING OUT THE INVENTION

Hereinafter, a detailed description will be given as to the present invention with reference to the accompanying drawing.

An apparatus for selectively preparing a high reactivity polybutene, a midrange reactivity polybutene and a non-reactive polybutene in a single plant according to the present invention includes: a reactive polybutene polymerization catalyst feeder for polymerization of a high reactivity polybutene and a midrange reactivity polybutene; a non-reactive polybutene polymerization catalyst feeder for polymerization of a non-reactive polybutene; and a reactor for polymerizing a reactant including isobutene into polybutene.

More specifically, the apparatus for selectively preparing a high reactivity polybutene, a midrange reactivity polybutene and a non-reactive polybutene in a single includes, as illustrated in FIG. 1, (a) a reactive polybutene polymerization catalyst feeder 2, (b) a non-reactive polybutene polymerization catalyst feeder 1, and (c) a reactor 3 and, as needed, further includes a neutralization and washing tank 4, a separation tank 5, a C4 distillation tower 6, and a light polymer (LP) distillation tower 7.

The reactive polybutene polymerization catalyst feeder 2 in (a) produces a reactive polybutene polymerization catalyst, which is then discharged to the reactor 3 through the bottom portion of the reactive polybutene polymerization catalyst feeder 2.

The reactive polybutene polymerization catalyst supplied through the reactive polybutene polymerization catalyst feeder may include a Lewis acid, such as boron trifluoride, etc., as a main catalyst, a cocatalyst and an auxiliary catalyst. According to the catalyst composition, the reactive polybutene polymerization catalyst may be provided by any one method selected from the group consisting of: (i) a method of placing and mixing a main catalyst such as boron trifluoride, etc., a cocatalyst and an auxiliary cocatalyst in the reactive polybutene polymerization catalyst feeder 2 and then injecting the mixture into the reactor 3; (ii) a method of injecting a main catalyst such as boron trifluoride, etc., a cocatalyst and an auxiliary cocatalyst into the reactor 3 while gathering the main catalyst, the cocatalyst and the auxiliary cocatalyst together in a pipe to form a complex compound; and (iii) a method of mixing a cocatalyst and an auxiliary cocatalyst with a reactant and then adding a main catalyst such as boron trifluoride, etc.

The reactive polybutene polymerization catalyst supplied through the reactive polybutene polymerization catalyst feeder is a Lewis acid that is a general Friedel-Crafts type catalyst and may not be specifically limited. For example, the reactive polybutene polymerization catalyst may include catalysts, such as boron trichloride, aluminum trichloride, zinc chloride, etc. But, the most preferred one is boron trifluoride, which is excellent to induce the formation of the terminal vinylidene and advantageously available for commercial use purposes. The reactive polybutene polymerization catalyst provided through the reactive polybutene polymerization catalyst feeder may also be a boron trifluoride complex catalyst that includes water or an alcohol compound as a cocatalyst and alkyl ether as an auxiliary cocatalyst in addition to boron trifluoride used as a main catalyst. Particularly, the cocatalyst used in the preparation may include, but is not specifically limited to, water or an alcohol compound having 1 to 4 carbon atoms that functions as a proton ($H^+$) donor. Specific examples of the alcohol compound may include methanol, ethanol, propanol, isopropyl alcohol (isopropanol), butanol, isobutanol, etc.

The auxiliary cocatalyst, which is to stabilize the protons produced by the cocatalyst and to control the reactivity, may include, but is not specifically limited to, alkyl ether having 2 to 10 carbon atoms. Specific examples of the alkyl ether may include dimethyl ether, diethyl ether, dipropyl ether, isopropyl sec-butyl ether, sec-butyl ether, isoamyl ether, isopropyl isoamyl ether, sec-butyl isoamyl ether, etc.

In the reactive polybutene polymerization catalyst supplied through the reactive polybutene polymerization catalyst feeder, as shown in the following chemical formula 1, the molar ratio of boron trifluoride, alcohol compound and alkyl ether is 1:0.8 to 1.6:0.1 to 0.9 (boron trifluoride ($BF_3$):alcohol compound ($R_1OH$):alkyl ether ($R_2$—O—$R_3$)), preferably 1:0.8 to 1.4:0.1 to 0.7 in the aspect of reaction activity. In other words, with respect to the boron trifluoride that is the catalyst, the molar ratio of the alcohol compound to alkyl ether is in the range of 0.9 to 2.5, preferably 0.9 to 2.1.

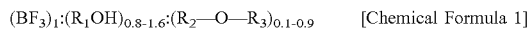
$(BF_3)_1:(R_1OH)_{0.8-1.6}:(R_2—O—R_3)_{0.1-0.9}$     [Chemical Formula 1]

In the chemical formula 1, $R_1$ is an alkyl group having 1 to 4 carbon atoms; and $R_2$ and $R_3$ are independently an alkyl group having 1 to 5 carbon atoms.

When the reactive polybutene polymerization catalyst supplied through the reactive polybutene polymerization catalyst feeder has the molar ratio of boron trifluoride, alcohol compound and alkyl ether out of the defined range, it may cause deterioration in the activity of the reactive polybutene polymerization catalyst (if the molar ratio of boron trifluoride, alcohol compound and alkyl ether is extremely high), or reduce the stability and the vinylidene content of the polybutene to below 80% (if the molar ratio of boron trifluoride, alcohol compound and alkyl ether is extremely low).

The reactive polybutene polymerization catalyst supplied through the reactive polybutene polymerization catalyst feeder is injected in such an amount that the boron trifluoride content is in the range of 0.05 to 1.0 part by weight with respect to 100 parts by weight of the isobutene in the reactant, which is, for example, C4 raffinate-1 having an isobutene content of at least 10 wt. %.

The non-reactive polybutene polymerization catalyst feeder 1 in (b) mixes a low molecular polybutene with a Lewis acid to produce a non-reactive polybutene polymerization catalyst in the slurry form, which is then discharged to the reactor 3 through the bottom portion of the non-reactive polybutene polymerization catalyst feeder 1.

The non-reactive polybutene polymerization catalyst supplied through the non-reactive polybutene polymerization catalyst feeder is a Lewis acid that is a general Friedel-Crafts type catalyst and may not be specifically limited. For example, the non-reactive polybutene polymerization catalyst includes aluminum trichloride, zinc chloride, iron chloride, etc. But, the aluminum trichloride is most preferred. When the catalyst is in use, isobutene that is highly reactive in the C4 reactant mixture becomes the primary participant in the reaction, making it possible to produce a non-reactive polybutene.

The non-reactive polybutene polymerization catalyst supplied through the non-reactive polybutene polymerization catalyst feeder is injected in such an amount that the aluminum trichloride content is in the range of 0.05 to 1.0 part by weight with respect to 100 parts by weight of the isobutene in the C4 raffinate-1 having an isobutene content of at least 10 wt. %.

The reactor 3 in (c) is the place that allows a polymerization of the reactant including isobutene in the presence of a catalyst supplied from the reactive polybutene polymerization catalyst feeder 2 or the non-reactive polybutene polymerization catalyst feeder 1 and discharges the polymerization product through its top portion. The reactor 3 is also designed to control the polybutene product in regards to molecular weight and vinylidene content by adjusting the temperature, the strength of the catalyst and the after-reaction isobutene content.

The reactive polybutene polymerization catalyst feeder provides a catalyst to yield a high reactivity polybutene and a midrange reactivity polybutene, while the non-reactive polybutene polymerization catalyst feeder provides a catalyst to yield a non-reactive polybutene. Through the reactive polybutene polymerization catalyst feeder, a high reactivity polybutene or a midrange reactive polybutene can be synthesized by polymerization according to the difference in the molar ratio of the cocatalyst to the main catalyst and the amount of the catalyst. The reactive polybutene is a polybutene having a terminal vinylidene content of at least 40%. More specifically, the high reactivity polybutene out of the reactive polybutene has a terminal vinylidene content greater than 70%, preferably in the range of 71 to 99%, more preferably 75 to 95%, most preferably 80 to 95%. The midrange reactivity polybutene out of the reactive polybutene has a terminal vinylidene content in the range of 40 to 70%, preferably 41 to 69%, more preferably 45 to 65%. The non-reactive polybutene has a terminal vinylidene content less than 40%, preferably 1 to 39%, more preferably 5 to 35%. The reactive polybutene and the non-reactive polybutene prepared by the polymerization reaction normally have a number average molecular weight (Mn) of 300 to 5,000.

The reactant used to prepare the reactive polybutene and the non-reactive polybutene contains isobutene in an amount of at least 10 wt. %, preferably 25 to 60 wt. %. For example, the reactant is the C4 raffinate-1 that is obtained by extracting 1,3-butadiene from a C4 hydrocarbon mixture derived by the naphtha cracking process or the crude refining process. Otherwise, the reactant can be obtained by diluting pure isobutene with an alkane. The concentration of the isobutene is in the range of 25 to 60% for the sake of securing a proper polymerization for the product. The reactant may be supplied through the transfer line between the reactive polybutene polymerization catalyst feeder 2 or the non-reactive polybutene polymerization catalyst feeder 1 and the reactor 3.

Referring to FIG. 1 again, the neutralization and washing tank 4, which is further included in the apparatus, adds water from the transfer line to the reactant discharged from the reactor 3 to eliminate the catalyst component from the reactant and neutralize the reactant. The reactant is discharged to the separation tank 5 through the side portion of the neutralization and washing tank 4. The separation tank 5 makes the use of layer separation so that the water containing the catalyst component eliminated in the neutralization and washing tank 4 is discharged through the bottom portion of the separation tank 5. The organic compound remaining after removal of the catalyst from the reactant is discharged through the top portion of the separation tank 5. The C4 distillation tower 6 distills the unreacted C4 from the organic compound supplied by the separation tank 5. The unreacted C4 is discharged and collected through the top portion of the C4 distillation tower 6. The remaining organic compound is discharged through the bottom portion of the C4 distillation tower 6 and injected into the light polymer (LP) distillation tower 7. The LP distillation tower 7 distills light polymers (LP) from the remaining organic compound supplied by the C4 distillation tower 6. The light polymers (LP) are discharged and collected through the top portion of the LP distillation tower 7. The reactive polybutene and the non-reactive polybutene thus obtained are sent to the bottom portion of the LP distillation tower 7 and stored in a product storage tank.

Hereinafter, reference will be made to FIG. 1 to describe a method for selectively preparing a high reactivity polybutene, a midrange reactivity polybutene and a non-reactive polybutene in a single plant according to the present invention. Given for reference in the detailed description of the preparation method, FIG. 1 is to illustrate merely one of many different parallel preparation methods for selectively producing the three types of polybutene and is not construed to include all of the present invention.

The preparation method for the polybutene that is obtained by the method for selectively preparing a high reactivity polybutene, a midrange reactivity polybutene and a non-reactive polybutene according to the present invention includes: selectively producing a reactive polybutene polymerization catalyst for polymerization of the high reactivity polybutene and the midrange reactivity polybutene or a non-reactive polybutene polymerization catalyst for polymerization of the non-reactive polybutene; and polymerizing a reactant including isobutene in the presence of the reactive polybutene polymerization catalyst or the non-reactive polybutene polymerization catalyst.

In a detailed description of the preparation method for the reactive polybutene, a reactant such as C4 raffinate-1, a catalyst such as boron trifluoride pertaining to the catalyst composition, a cocatalyst, and an auxiliary cocatalyst are injected into the reactor 3 to initialize the reaction. In the reactor 3, the temperature, the strength of the catalyst and the after-reaction isobutene content are regulated to control the polybutene product in regards to molecular weight and vinylidene content. The polymerization method for the high reactivity polybutene and the midrange reactivity polybutene can be carried out under the normal reaction conditions, such as, for example, at the temperature of −40 to 20° C., preferably −35 to 10° C., and under the pressure of normally 3 kg/cm$^2$ or above, preferably 3.5 to 10 kg/cm$^2$, in order to maintain the reactant in the liquid state. In addition, it is economical to perform the polymerization reaction for a residence time of 5 to 100 minutes, preferably 10 to 45 minutes so that the isobutene conversion rate amounts to at least 70%, preferably 80 to 95%, in the polymerization process of the midrange reactive polybutene; and that the isobutene conversion rate is at least 70%, preferably 80 to 95%, to maintain the high terminal vinylidene content in the polymerization process of the high reactivity polybutene.

In a detailed description of the preparation method for the non-reactive polybutene, aluminum trichloride is mixed with a low molecular polybutene to take the slurry form in the non-reactive polybutene polymerization catalyst feeder 1 in order to facilitate its quantitative injection. The aluminum trichloride together with a reactant such as C4 raffinate-1 is injected into the reactor 3 through the transfer line to initiate the reaction. In the reactor 3, the temperature, the strength of the catalyst and the after-reaction isobutene content are adjusted to control the polybutene product in regards to molecular weight and vinylidene content. The polymerization method for the non-reactive polybutene can be carried out under the normal reaction conditions, such as, for example, at the temperature of −20 to ° C., preferably −10 to 50° C., and under the pressure of normally at least 3 kg/cm$^2$, preferably 3.5 to 10 kg/cm$^2$, in order to maintain the reactant in the liquid state. Further, it is economical to perform the polymerization reaction for a residence time of 5 to 100 minutes, preferably 10 to 45 minutes, so that the isobutene conversion rate amounts to at least 70%, preferably at least 90 to 95%, in the polymerization process of the non-reactive polybutene.

An additional step used in common in the preparations of the reactive polybutene and the non-reactive polybutene and further included as needed is adding water into the neutralization and washing tank 4 to eliminate the catalyst from the reactant discharged from the reactor 3 and neutralize the reactant. The organic compound out of the reactant transferred into the separation tank 5 is separated and injected into the C4 distillation tower 6. The water (containing the catalyst component washed off through the neutralization and washing tank) used in the neutralization and washing tank 4 is discharged through the bottom portion of the separation tank 5. The unreacted C4 is distilled in the C4 distillation tower 6 and collected in the form of R-4 (C4 raffinate-4). The remaining reactant is transferred to the bottom portion of the C4 distillation tower 6 and injected into the light polymer (LP) distillation tower 7. The lower polymer (LP) is distilled in the LP distillation tower 7 and collected into the top portion of the LP distillation tower 7. The non-reactive polybutene (i.e., conventional polyisobutylene) is transferred to the bottom portion of the LP distillation tower 7 and collected into a product storage tank.

The preparation method of the present invention allows an additional production of the high reactivity polybutene and the midrange reactivity polybutene in a plant designed to produce a non-reactive polybutene in the above-described procedures. The production order of polybutenes is selectively given. In a plant for producing a non-reactive polybutene, for example, it is possible to suspend the injection of the aluminum trichloride catalyst and convert the plant system to the production of a high reactivity polybutene and a midrange reactivity polybutene.

Hereinafter, the present invention will be described in further detail with reference to the specific examples.

[Example 1] Polymerization of High Reactivity Polybutene

A complex catalyst (the molar ratio of isopropanol to boron trifluoride (BF$_3$)=1.6:1) prepared in a complex catalyst preparation tank and a reactant (C4 raffinate-1) having the defined composition of the following Table 1 are successively injected into a reaction tank, which is maintained at maintained at −25.0° C. The reactor is under the pressure of at least 3 kg/cm$^2$ in order to maintain the reactant in the liquid state, and the average residence time is 45 minutes. The boron trifluoride complex catalyst is injected in such an amount as to have a boron trifluoride (BF$_3$) content of 0.27 part by weight with respect to 100 parts by weight of isobutene in the reactant. After an elapse of 180 minutes, the reactant coming out of the reaction tank is added to a solution containing 5 wt. % of caustic soda and then transferred to a neutralization and washing tank to suspend the polymerization reaction and eliminate the catalyst. Subsequently, the waste water containing the catalyst washed off is transferred to a separation tank and discharged through the bottom portion of the separation tank, while the reactant is injected into a C4 distillation tower through the top portion of the separation tank. The reactant in the C4 distillation tower is heated up to 100° C. The unreacted C4 is distilled and collected to the top portion of the C4 distillation tower. The remaining reactant is transferred to an LP distillation tower through the bottom portion of the C4 distillation tower. The reactant injected into the LP distillation tower is heated at 230° C. under 25 torr for 30 minutes. The lower polymer (LP) is distilled and collected to the top portion of the LP distillation tower. The high reactivity polybutene is sent to the bottom portion of the LP distillation tower and transferred to a storage tank. The high reactivity polybutene thus produced is measured in regards to the number average molecular weight (Mn) and the polydispersity using the gel permeation chromatography (GPC) method and the vinylidene content using the C$^{13}$-NMR method. As a result, the isobutene conversion rate is 87%, and the vinylidene content is 87% (Mn=2,350, PD=1.85).

TABLE 1

| | | | Component | | | |
|---|---|---|---|---|---|---|
| | isobutane | n-butane | 1-butene | C-2-butene | T-2-butene | isobutene |
| Content (wt %) | 2.7 | 10.0 | 26.1 | 4.5 | 9.3 | 47.4 |

[Example 2] Polymerization of Midrange Reactivity Polybutene

A complex catalyst (the molar ratio of isopropanol to boron trifluoride (BF$_3$)=1:1) prepared in a complex catalyst preparation tank and a reactant (C4 raffinate-1) having the defined composition of Table 1 are successively injected into a reaction tank, which is maintained at maintained at 0° C. The reactor is under the pressure of at least 3 kg/cm$^2$ in order to maintain the reactant in the liquid state, and the average residence time is 45 minutes. The boron trifluoride complex catalyst is injected in such an amount as to have a boron trifluoride (BF$_3$) content of 0.17 part by weight with respect to 100 parts by weight of isobutene in the reactant. The other polymerization procedures are performed in the same manner as described in Example 1 to yield a product. The midrange reactivity polybutene thus obtained has an isobutene conversion rate of 94% and a vinylidene content of 58% (Mn=960, PD=1.30).

[Example 3] Polymerization of Non-Reactive Polybutene

A catalyst in the slurry form as prepared with a non-reactive polybutene having a molecular weight of 300 and aluminum trichloride (AlCl$_3$) in an aluminum trichloride catalyst preparation tank and a reactant (C4 raffinate-1) having the defined composition of Table 1 are successively injected into a reaction tank, which is maintained at maintained at 25.0° C. The reactor is under the pressure of at least 3 kg/cm$^2$ in order to maintain the reactant in the liquid state, and the average residence time is 45 minutes. The catalyst is injected in such an amount as to have an aluminum trichloride (AlCl$_3$) content of 0.07 part by weight with respect to 100 parts by weight of isobutene in the reactant. The other polymerization procedures are performed in the same manner as described in Example 1 to yield a product. The non-reactive polybutene thus obtained has an isobutene conversion rate of 96% and a vinylidene content of 9% (Mn=970, PD=1.70).

As can be seen from the Examples of the present invention, the present invention enables the production of at least three types of polybutene in a single plant.

What is claimed is:

1. An apparatus for selectively preparing a high reactivity polybutene, a midrange reactivity polybutene and a non-reactive polybutene in a single plant, wherein the apparatus comprises:
   a reactive polybutene polymerization catalyst feeder for polymerization of the high reactivity polybutene and the midrange reactivity polybutene;
   a non-reactive polybutene polymerization catalyst feeder for polymerization of the non-reactive polybutene; and
   a reactor for polymerizing a reactant including isobutene into polybutene,
   a neutralization and washing tank for adding water to the reactant discharged from the reactor to eliminate catalyst component from the reactant and neutralize the reactant;
   a separation tank for eliminating water containing the catalyst component and discharging organic compounds remaining after removal of the catalyst from the reactant; and
   a C$_4$ distillation tower for distilling unreacted C$_4$ from the organic compounds supplied by the separation tank and discharging the remaining organic compound,
   wherein the reactive polybutene polymerization catalyst feeder provides a catalyst to yield the high reactivity polybutene and the midrange reactivity polybutene; and the non-reactive polybutene polymerization catalyst feeder provides a catalyst to yield the non-reactive polybutene, and
   wherein the catalyst provided through the reactive polybutene polymerization catalyst feeder comprises a Lewis acid selected from the group consisting of boron trifluoride, boron trichloride, aluminum trichloride, and zinc chloride; and the catalyst provided through the non-reactive polybutene polymerization catalyst feeder comprises a Lewis acid selected from the group consisting of aluminum trichloride, zinc chloride, and iron chloride.

2. The apparatus for selectively preparing a reactive polybutene and a non-reactive polybutene as claimed in claim 1, wherein the high reactivity polybutene is a polybutene having a terminal vinylidene content greater than 70%; the midrange reactivity polybutene is a polybutene having a terminal vinylidene content in the range of 40 to 70%; and the non-reactive polybutene is a polybutene having a terminal vinylidene content less than 40%.

3. The apparatus for selectively preparing a reactive polybutene and a non-reactive polybutene as claimed in claim 1, wherein the reactive polybutene polymerization catalyst provided through the reactive polybutene polymerization catalyst feeder comprises boron trifluoride as a main catalyst, water or an alcohol compound as a cocatalyst, and alkyl ether as an auxiliary cocatalyst.

4. The apparatus for selectively preparing a reactive polybutene and a non-reactive polybutene as claimed in claim 1, wherein the reactive polybutene polymerization catalyst is provided to have the content of boron trifluoride in the range of 0.05 to 1.0 part by weight with respect to 100 parts by weight of isobutene; and the non-reactive polybutene polymerization catalyst is provided to have the content of aluminum trichloride in the range of 0.05 to 1.0 part by weight with respect to 100 parts by weight of isobutene.

5. The apparatus for selectively preparing a reactive polybutene and a non-reactive polybutene as claimed in claim 1, wherein the reactive polybutene polymerization catalyst feeder uses any one method selected from the group consisting of: (i) a method of placing and mixing a main catalyst including boron trifluoride, a cocatalyst and an auxiliary cocatalyst in the reactive polybutene polymerization catalyst feeder and then injecting the resultant mixture into the reactor; (ii) a method of injecting a main catalyst including boron trifluoride, a cocatalyst and an auxiliary cocatalyst into the reactor while gathering the main catalyst, the cocatalyst and the auxiliary cocatalyst together in a pipe to form a complex compound; and (iii) a method of mixing a cocatalyst and an auxiliary cocatalyst with a reactant and then adding a main catalyst including boron trifluoride.

* * * * *